United States Patent [19]
Andermo

[11] 3,885,873
[45] May 27, 1975

[54] DEVICE FOR MEASURING THE RELATIVE MOVEMENT BETWEEN TWO OBJECTS
[75] Inventor: Nils Ingvar Andermo, Taby, Sweden
[73] Assignee: Stiftelsen Institutet for Mikrovagsteknik Vid Teknishka Hogsk-lan i Stockholm, Stockholm, Sweden
[22] Filed: Dec. 12, 1972
[21] Appl. No.: 314,320

[52] U.S. Cl. .................. 356/28; 324/161; 324/175
[51] Int. Cl. .............................................. G01p 3/36
[58] Field of Search ...... 324/160, 172, 175; 356/27, 356/28

[56] References Cited
UNITED STATES PATENTS
3,689,157  9/1972  Andermo .......................... 324/175
3,804,517  4/1974  Meyr et al. ...................... 324/175 X FOREIGN PATENTS OR APPLICATIONS
680,331  2/1964  Canada ............................. 324/172

Primary Examiner—Alfred E. Smith
Assistant Examiner—Rolf Hille
Attorney, Agent, or Firm—Sughrue, Rothwell, Mion, Zinn and Macpeak

[57] ABSTRACT

A device for measuring the relative movement between two objects of the kind having two sensors mounted on one of the objects in spaced-apart positions along the direction of relative motion between the objects is disclosed. Irregularities sensed on the other object generate two substantially equal signals displaced in time as a function of the spacing between the two sensors and the rate of relative movement between the two objects. One of the signals is periodically sampled and stored. The stored signal is compared with the other signal to form a differential signal. The differential signal is periodically and alternately supplied to opposite polarity inputs of an integrator, the output signal of which is used to generate a frequency signal proportional to the rate of movement between the two objects.

4 Claims, 8 Drawing Figures

Fig. 3
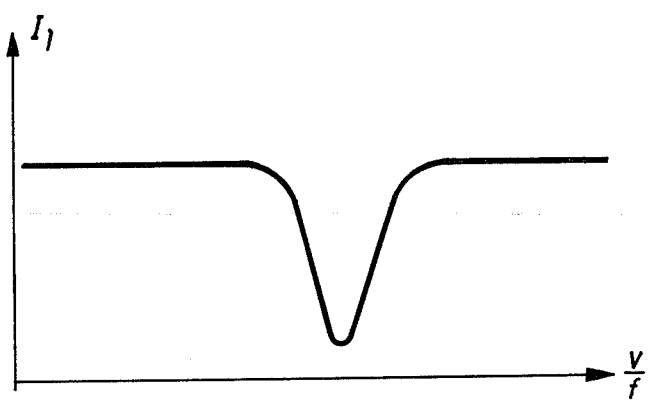
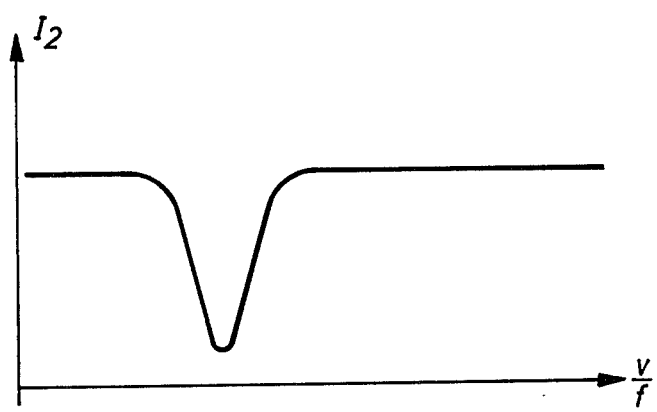
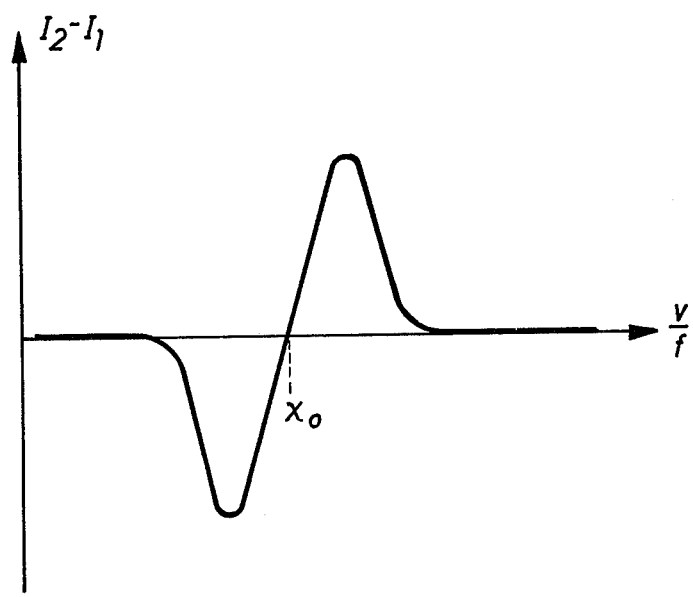

DEVICE FOR MEASURING THE RELATIVE MOVEMENT BETWEEN TWO OBJECTS

The present invention relates to a device for measuring the relative movement between two objects.

More particularly the invention has for its object to provide an improved device of the kind comprising two sensors mounted on one of said objects in spaced apart positions along the direction of relative motion between said objects to sense irregularities on the other object and generate two substantially equal signals which are mutually displaced in time as a function of the spacing between the two sensors and the rate of relative movement between the two objects.

According to the invention said device further comprises sampling means for periodically sampling one of said signals and storing the sampled signal value, comparison means for comparing the stored signal value with the other signal and forming a differential signal, a switch unit for periodically supplying the differential signal to an integrator during two selected time intervals, a converter supplied with the output signal from the integrator and arranged to generate a frequency signal, and a control unit supplied with said frequency signal and arranged to control the operation of the sampling means and the switch unit so as to cause the frequency of the output signal from the converter to become proportional to the relative speed between said objects.

Below the invention will be described more in detail, reference being had to the accompanying drawings, in which.

Figure 1:
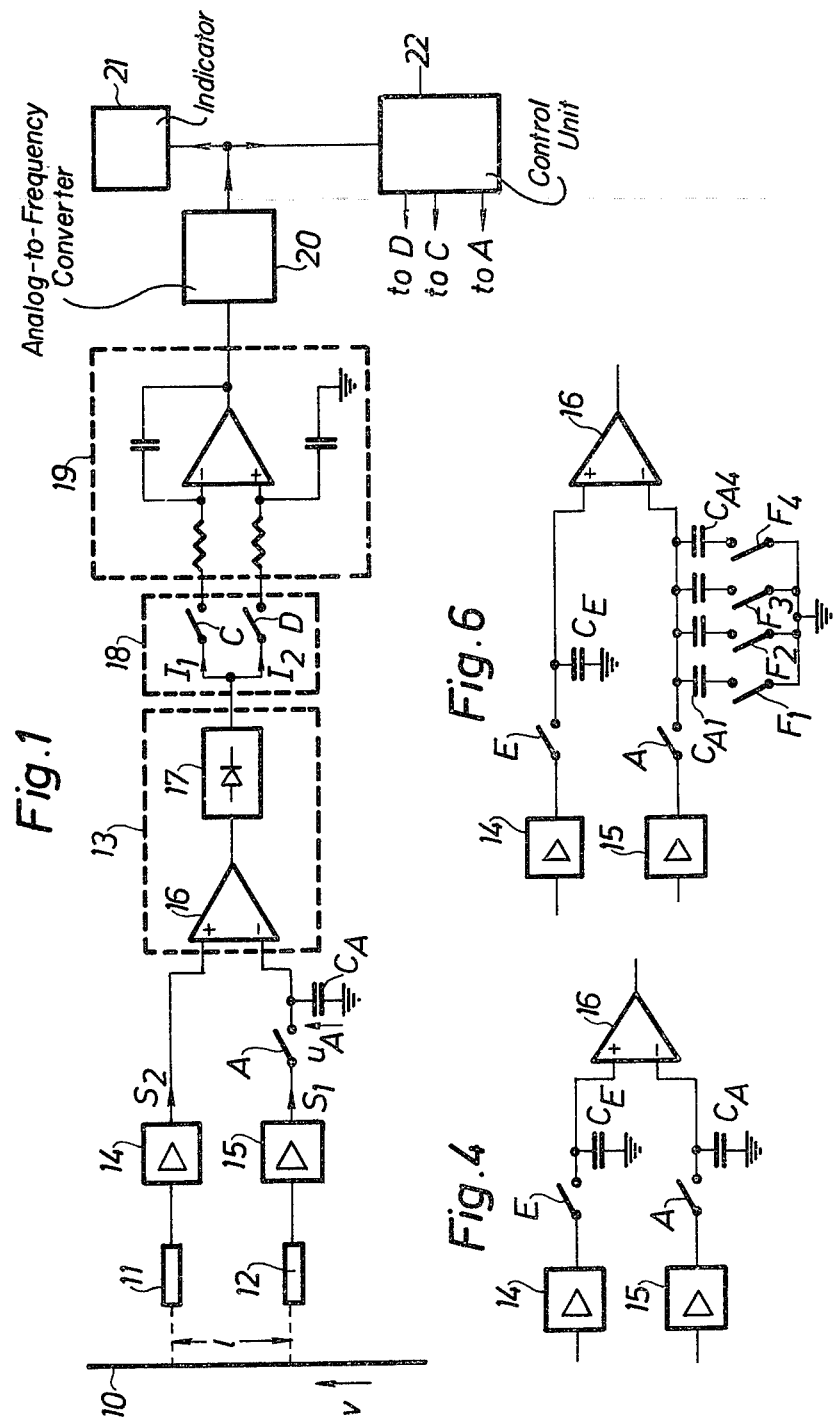
FIG. 1 is a block diagram, illustrating a device according to one embodiment of the invention.
Figure 5:
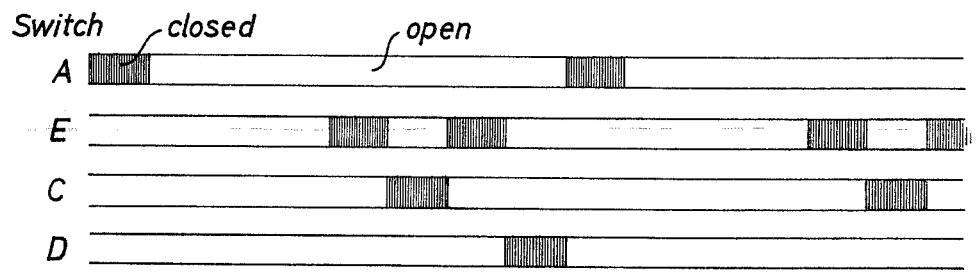
Figure 7:
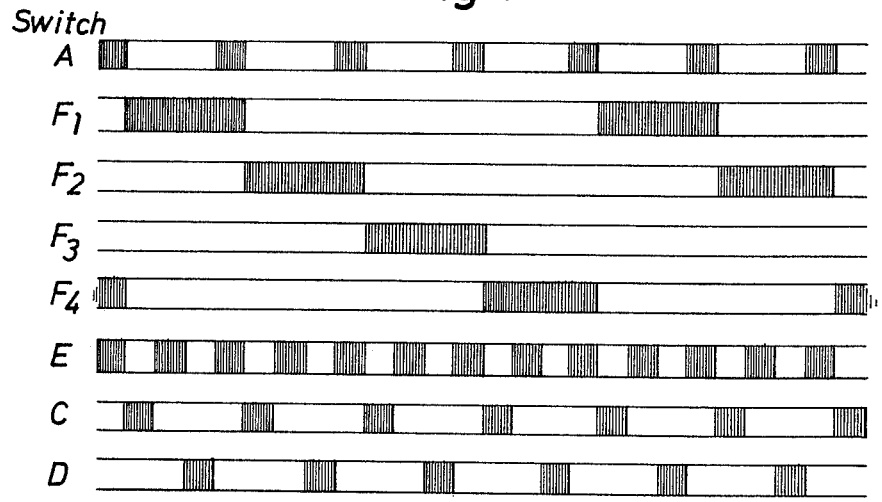
Figure 8:
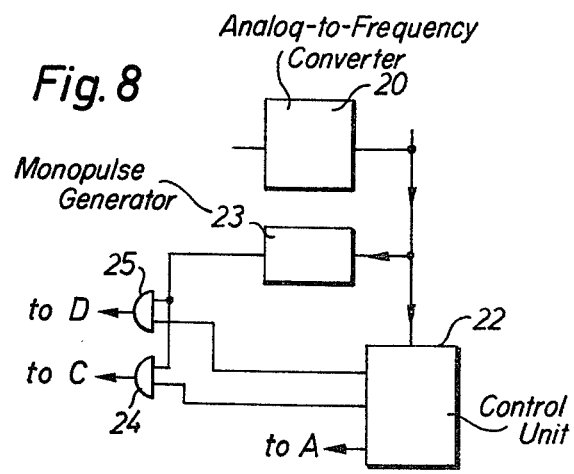

FIG. 3 diagrammatically illustrates the mean input currents to an integrator included in said device;

FIG. 4 is a block diagram, showing a first modification of a part of the device of FIG. 1;

FIG. 5 diagrammatically illustrates a suitable operation of some switches contained in the modified device;

FIG. 6 is a block diagram, illustrating a further modification of the device;

FIG. 7 diagrammatically illustrates the operation of switches of a device modified in accordance with FIG. 6, and FIG. 8 is a block diagram, showing a modification of another part of the device of FIG. 1;

FIG. 1 shows a device for measuring the rate of relative movement between two objects. The device is mounted on one of said objects and provided with two sensors 11 and 12 which are spaced apart a predetermined distance l in the direction of relative motion between said objects. Said sensors are arranged to sense irregularities on the other object 10, which is assumed to have a considerable length in said direction.

For instance, the device may be used for measuring the speed of a railway train, in which case the device may be mounted on the engine and said other object 10 may be formed by the rail supporting the train. However, it should be noted, that the invention is not restricted to this particular application. Thus, the invention may be utilized also in many other cases. For instance, the device comprising the two sensors 11 and 12 may be mounted on a stationary support to sense the speed at which a continuous material string or path is caused to pass said support.

The two sensors 11 and 12 may be of any suitable type, preferably not relying on mechanical contact with the other object 10. The sensors may suitably be of electro-optical type and arranged to generate electric output signals varying in response to variations in the incoming light due to surface irregularities on object 10. In this case the device may incorporate one or, more light sources directing a beam of light towards object 10 which will reflect said light. The reflected light will be sensed by sensors 11 and 12 which will generate two similar signals of substantially equal shape but displaced in time as a function of the spacing between sensors 11 and 12 and the rate of relative movement between them and object 10.

According to FIG. 1, each sensor has its output connected to one input of a comparator unit 13 over an amplifier 14 and 15, respectively. From FIG. 1 it can be seen that amplifier 14 is directly connected to one input of comparator unit 13 while amplifier 15 is connected to the other input of said unit over a switch A. Further, a capacitor $C_A$ is connected between the latter input of the comparator unit and ground.

The comparator unit 13 is formed by a differential amplifier 16 and a rectifier 17 connected to the output of amplifier 16. The output signal from rectifier 17 is supplied to a switching unit 18 comprising two switches C and D which are connected in parallel to feed said signal each to one appurtenant input of an integrator 19. The output of integrator 19 is connected to the input of an analog-to-frequency converter 20 having its output coupled, on the one hand, to an indicator 21 and, on the other, to a control unit 22 serving to control the operation of switches A, C and D.

Figure 2:
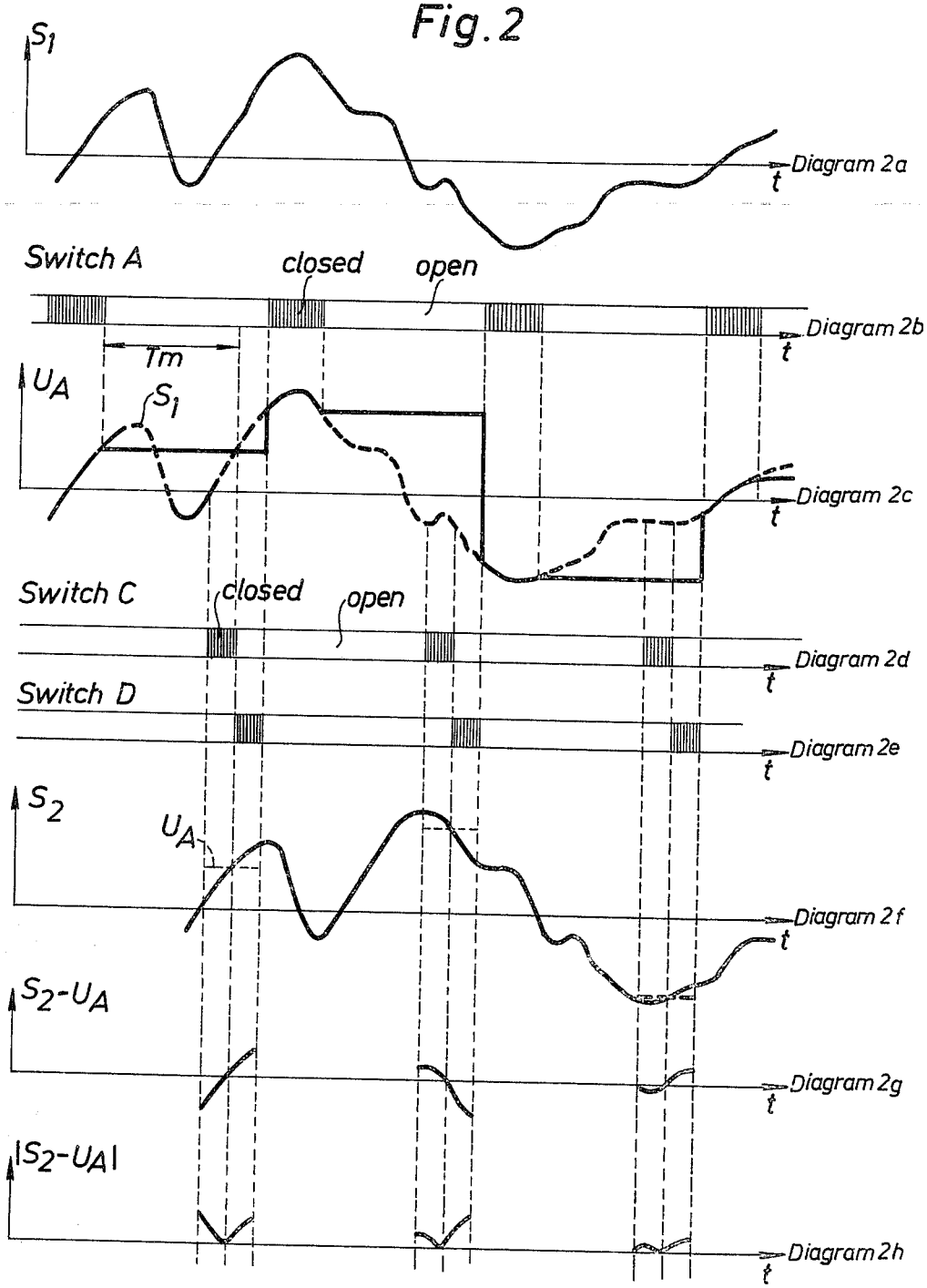
FIG. 2 shows a plurality of diagrams, illustrating possible wave forms for some of the signals appearing in the device of FIG. 1 and the operation of a number of switches contained in said device.

FIG. 2 schematically illustrates the wave forms of some of the signals appearing in the device above described. Diagram 2a shows an assumed shape of the signal $S_1$ appearing at the output of amplifier 15. Diagram 2b illustrates the opening and closing operation of switch A under the control from unit 22. The filled rectangular areas represent time intervals during which said switch is closed. Diagram 2c shows in full lines the voltage $u_A$ appearing across capacitor $C_A$ and, additionally, in dashed lines signals $S_1$. Diagram 2d illustrates the operation of switch C and diagram 2e the operation of switch D. As in diagram 2b, the filled rectangular areas represent the time intervals during which the respective switch is closed. Diagram 2f shows in full lines the output signal $S_2$ from amplifier 14 which has the same shape as the output signal $S_1$ from amplifier 15 but is displaced in time relatively to the latter signal as a consequence of the spacing l between the two sensors 11 and 12 and the relative movement of object 10. Said time displacement between signals $S_1$ and $S_2$ amounts to $T_m = l/v$, where $v$ designates the relative speed between object 10 and the two sensors 11 and 12. Additionally, selected portions of voltage $u_A$ are shown in dashed lines in diagram 2f. Diagram 2g shows corresponding portions of the output signal $S_2 - u_A$ from amplifier 16 and diagram 2h corresponding portions of the output signal $|S_2 - u_A|$ from rectifier 17. In this connection it should be added that rectifier 17 need not have a linear characteristic.

The purpose of switch A and capacitor $C_A$ is to function as a sampling unit which under the control of unit 22 regularly samples the output signal $S_1$ from amplifier 15 and stores each sampled value during a sufficient time to permit a comparison between said value and signal $S_2$ to be carried out by means of comparator unit 13 in a manner to be described more in detail below.

As illustrated in diagrams 2d and 2e switches C and D are arranged to be closed periodically during subsequent time intervals. During the first interval, when switch C is in its closed position, the output signal from comparator unit 13 is fed to the negative input of integrator unit 19, while during the following interval, when switch D is closed, said signal is supplied to the positive input of the integrator. The output signal from the integrator unit will consist of a DC voltage, the magnitude of which will vary in dependence of the difference $I_2-I_1$ between the mean currents $I_1$ and $I_2$, respectively, fed to the negative and positive inputs of the integrator. In FIG. 3 said mean currents $I_1$ and $I_2$ and the difference $I_2-I_1$ therebetween have been shown as functions of the ratio $v/f$, where $v$ still designates the relative speed of object 10 while $f$ is the repetition frequency of a pulse train generated in the analog-to-frequency converter 20 in response to the applied DC voltage and fed to the control unit 22 to control the operation of switches A, C and D. From FIG. 3 it can be seen that curve $I_2-I_1$ representing the resulting mean input current to integrator 19 intersects the zero level defined by the horizontal axis for a specific value $x_o$ of said ratio $v/f$. This value $x_o$ is determined by the design of control unit 22 which substantially consists of a plurality of frequency dividing circuits and gate circuits.

In the situation illustrated in FIG. 2 the device is assumed to be in a steady state condition in which the speed $v$ is constant and the frequency $f$ has assumed a value amounting to $v/x_o$. If now the measured speed $v$ increases, the ratio $v/f$ will become greater than $x_o$ causing a positive net input current to integrator 19, whereby convertor 20 will receive an increased input voltage causing frequency $f$ to increase until a steady state condition $v/f=x_o$ is reached again. In similar manner, a reduction of the measured speed $v$ will result in a corresponding reduction of frequency $f$ due to a negative net input current to integrator 19.

Through this arrangement frequency $f$ will continuously tend to assume a value directly proportional to the relative speed $v$ between object 10 and sensors 11 and 12 whereby said speed can be determined simply by measuring the repetition frequency $f$ of the pulse train generated in convertor 20. As illustrated in FIG. 1, said pulse train is fed also to an indicator 21. This indicator may be of any suitable type and could preferably be calibrated so as to give a direct indication of the existing value of speed $v$. If desired, the device could also be used for measuring the total length of the path travelled by the movable object. In such a case said length can easily be indicated by means of a counter supplied by the output pulses from convertor 20. In the case described above, the output signal $S_2$ from amplifier 14 is directly transferred to the appurtenant input of differential amplifier 16. However, for certain applications it may be desirable to sample and store signal $S_2$ in a similar manner to signal $S_1$. The sampling of signal $S_2$ should then be controlled by unit 22 to cause the sampled value of said signal to be replaced between each shift of the input signal to integrator 19 by means of switches C and D. A correspondingly modified circuit arrangement is shown in FIG. 4. Between amplifier 14 and differential amplifier 16 there is connected a sampling and storing unit comprising a switch E and capacitor $C_E$. A suitable manner of operation of switches A, C, D and E is shown in FIG. 5.

For such applications where the performance requirements are very high the sampling density could be increased by increasing the number of storage capacitors. As illustrated in FIG. 6, four storage capacitors ($C_{A1} \ldots C_{A4}$) are connected to the line connecting the output of amplifier 15 to the negative input of differential amplifier 16. Each capacitor can be connected to ground over a corresponding switch $F_1 \ldots F_4$. The operation of the various switches is illustrated in FIG. 7. The abovementioned addition to further storage capacitors and the increased sampling frequency will result in an increased magnitude and hence a greater slope of the curve (FIG. 3) representing the resulting input current to the integrator. This means that the device will respond faster to changes in speed $v$.

In the case illustrated in FIGS. 1 and 2 the control unit 22 is assumed to supply switches C and D with control pulses the length of which varies inversely proportional to the instantaneous value of frequency $f$.

FIG. 8 shows a suitable modification of the circuit for improving the operation of the device if it has to work over an extended relative speed range. Unit 23 is a monopulse generator which delivers an output pulse of constant length for each trigger pulse received from converter 20. Gates 24 and 25 serve to combine the output pulses from unit 23 with the control pulses for switches C and D delivered by unit 22 and to form modified control pulses of constant length. The total time during which each switch C and D is closed will thus be proportional to frequency $f$. This means that the time constant of integrator 19 will be proportional to said frequency whereby noise disturbances in the output signal from the integrator will be reduced. The noise remaining in the integrator output signal has a constant amplitude over the whole measuring range of the device. With frequency dependent pulse length as in the basic design shown in FIG. 1 the magnitude of the noise in the output signal from the integrator was inversely proportional to the speed.

Naturally, the invention is not restricted to the embodiments above described. Especially, it should be mentioned that the various signals can be generated and treated in digital or analog form in different parts of the system provided, of course, that the required converters to and from digital form are included. The different units above described may thus be designed for operating on either digital or analog signals.

What I claim is:

1. A device for measuring the relative movement between two objects, comprising two sensors mounted on one of said objects in spaced-apart positions along the direction of relative motion between said objects to sense irregularities on the other object and generate two signals of substantially equal shape, but displaced in time as a function of the relative speed between the two objects, sampling means for periodically sampling one of said signals and storing the sampled signal value, comparison means for comparing the stored signal value with the other signal and forming a differential signal, a switch unit means for alternately and periodically supplying the differential signal to opposite polarity inputs of an integrator during two selected time intervals, a voltage-to-frequency converter supplied with the output signal from the integrator and arranged to generate a frequency signal, and a control unit means supplied with said frequency signal for controlling the operation of the sampling means and the switch unit means so as to cause the frequency of the output signal from the converter to become proportional to the relative speed between said objects.

2. A device for measuring the relative movement between two objects as recited in claim 1 further comprising indicator means supplied with said frequency signal for indicating the rate of movement between the two objects as a function of said frequency signal.

3. A device for measuring the relative movement between two objects as recited in claim 1 further comprising second sampling means controlled by said control unit means for periodically sampling said other signal and storing the sampled signal value.

4. A device for measuring the relative movement between two objects as recited in claim 1 wherein said sampling means comprises a single pole, single-throw switch means controlled by said control unit means to periodically close to sample one of said signals, a plurality of storage capacitors, each having one plate connected to the single pole of said switch means, and a plurality of switches each connected to the other plate of a corresponding one of said plurality of storage capacitors and a reference potential, said plurality of switches being controlled by said control unit means for periodically and sequentially closing to connect said other corresponding plate to said reference potential.

* * * * *